(12) United States Patent
Ammann et al.

(10) Patent No.: US 8,689,634 B2
(45) Date of Patent: Apr. 8, 2014

(54) SYSTEMS AND METHODS FOR MODE SHAPE IDENTIFICATION

(75) Inventors: Luke John Ammann, Greenville, SC (US); Liming Xu, Greenville, SC (US); Stephen Wassynger, Greenville, SC (US); Richard Pilson, Greer, SC (US)

(73) Assignee: Genral Electric Company, Schenectady, NY (US)

( * ) Notice: Subject to any disclaimer, the term of this patent is extended or adjusted under 35 U.S.C. 154(b) by 289 days.

(21) Appl. No.: 13/246,309

(22) Filed: Sep. 27, 2011

(65) Prior Publication Data

US 2013/0078094 A1    Mar. 28, 2013

(51) Int. Cl.
*G01H 1/10*    (2006.01)

(52) U.S. Cl.
USPC .................................. 73/655; 73/593; 73/660

(58) Field of Classification Search
USPC ................... 73/655, 593, 649, 654, 660, 661
See application file for complete search history.

(56) References Cited

U.S. PATENT DOCUMENTS

| | | | | |
|---|---|---|---|---|
| 4,422,333 | A * | 12/1983 | Leon | 73/660 |
| 5,471,880 | A * | 12/1995 | Lang et al. | 73/660 |
| 6,094,989 | A * | 8/2000 | Twerdochlib | 73/659 |
| 6,211,506 | B1 * | 4/2001 | Pryor et al. | 250/208.1 |
| 6,668,651 | B2 * | 12/2003 | Beausseroy et al. | 73/579 |
| 7,082,371 | B2 * | 7/2006 | Griffin et al. | 702/56 |
| 7,509,862 | B2 * | 3/2009 | Cohen et al. | 73/660 |
| 7,861,592 | B2 | 1/2011 | Twerdochlib | |
| 8,146,433 | B2 * | 4/2012 | Kishino et al. | 73/660 |
| 8,256,297 | B2 * | 9/2012 | Sue et al. | 73/643 |
| 8,353,204 | B2 * | 1/2013 | Mitaritonna et al. | 73/147 |
| 2011/0162457 | A1 | 7/2011 | Sue et al. | |

* cited by examiner

*Primary Examiner* — J M Saint Surin
(74) *Attorney, Agent, or Firm* — Sutherland Asbill & Brennan LLP

(57) ABSTRACT

Embodiments of the present application can provide systems and methods for mode shape identification of turbine buckets. According to one embodiment, a system can be provided. The system can include a turbine bucket having numerous trigger patterns disposed at a distal end of the turbine bucket. A sensor is disposed adjacent to the distal end of the turbine bucket for detecting the trigger patterns. The trigger patterns are patterned to identify at least one mode shape of the turbine bucket.

20 Claims, 4 Drawing Sheets

SYSTEMS AND METHODS FOR MODE SHAPE IDENTIFICATION

FIELD OF THE INVENTION

Embodiments of the present application relate generally to gas turbine engines and more particularly to systems and methods for mode shape identification of turbine buckets.

BACKGROUND OF THE INVENTION

A high speed turbo machine, such as, for example, a gas turbine, generally include a number of buckets arranged in axially oriented rows, the rows of buckets being rotated in response to the force of a high pressure fluid flowing axially through the machine. Due to their complex design, natural resonant mechanical frequencies of the buckets may coincide with or be excited by certain bucket rotational speeds and rotational harmonics thereof. Each natural frequency is associated with a particular mode shape, each of which is a different combination of vibrational deflections such as along the rotational axis of the turbine, perpendicular to the rotational axis of the turbine, and so forth.

In known systems for monitoring and analyzing vibrations in shrouded bucket structures, where the shroud is made integral with the bucket, the shroud may be provided with triggers that are placed in the shroud. One trigger is generally provided to each shroud portion associated with a bucket such that each trigger corresponds to a bucket. In most field test and on-line applications, a sensor may be provided for sensing the arrival of each trigger as the trigger passes the sensor. The data is analyzed on the basis of data identified with each trigger, i.e., each bucket, such that the vibration characteristics of each target location are individually analyzed, based on multiple rotations of the bucket row, to characterize the vibration characteristics of the coupled shroud structure. In such systems, however, it is difficult to discern the mode shape of the buckets.

BRIEF DESCRIPTION OF THE INVENTION

Some or all of the above needs and/or problems may be addressed by certain embodiments of the present application. Disclosed embodiments may include systems and methods for mode shape identification. According to one embodiment, there is disclosed a system for mode shape identification. The system can include a turbine bucket having numerous trigger patterns disposed at a distal end of the turbine bucket. A sensor is disposed adjacent to the distal end of the turbine bucket for detecting the trigger patterns. The trigger patterns are patterned to identify at least one mode shape of the turbine bucket.

According to another embodiment, there is disclosed a method for mode shape identification. The method can include providing a turbine bucket. The method can also include patterning triggers at a distal end of the turbine bucket. Moreover, the method can include detecting the triggers with a sensor disposed adjacent to the distal end of the turbine bucket. The trigger patterns are patterned to identify at least one mode shape of the turbine bucket.

Further, according to another embodiment, there is disclosed another system for mode shape identification. The system can include a rotating element with numerous trigger patterns disposed on the rotating element. A sensor is disposed adjacent to the rotating element for detecting the trigger patterns. The trigger patterns are patterned to identify at least one mode shape of the rotating element.

Other embodiments, aspects, and features of the invention will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale, and wherein.

DETAILED DESCRIPTION OF THE INVENTION

Illustrative embodiments will now be described more fully hereinafter with reference to the accompanying drawings, in which some, but not all embodiments are shown. The present application may be embodied in many different forms and should not be construed as limited to the embodiments set forth herein; rather, these embodiments are provided so that this disclosure will satisfy applicable legal requirements. Like numbers refer to like elements throughout.

Figure 1:
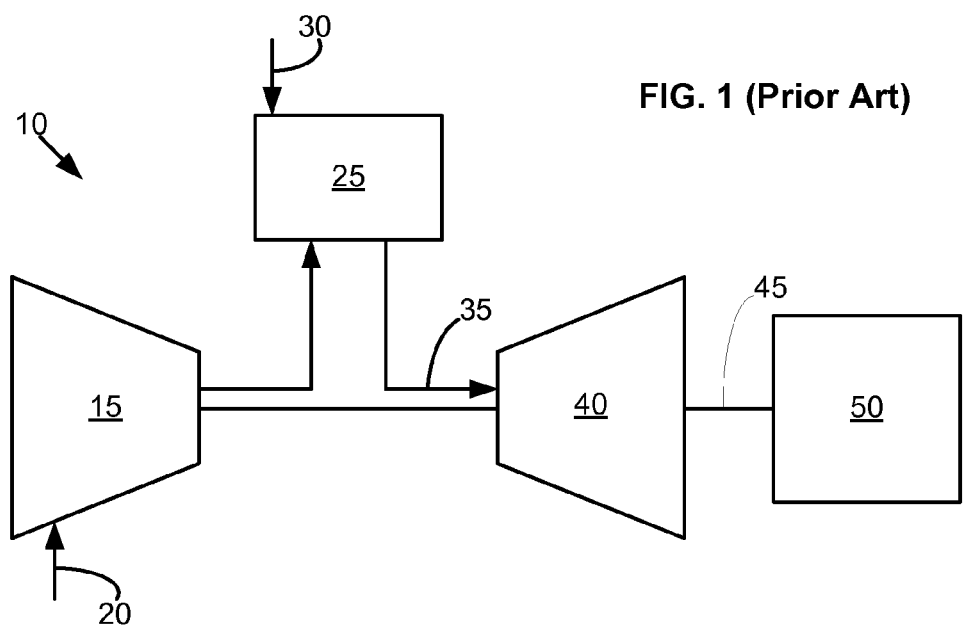
FIG. 1 is a schematic of an example diagram of a gas turbine engine with a compressor, a combustor, and a turbine, according to an embodiment.

Illustrative embodiments are directed to, among other things, systems and methods for mode shape identification of turbine buckets or other rotating elements. FIG. 1 shows a schematic view of a gas turbine engine 10 as may be used herein. As is known, the gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components.

Other types of gas turbine engines also may be used herein. Multiple gas turbine engines, other types of turbines, and other types of power generation equipment also may be used herein together.

Figure 2:
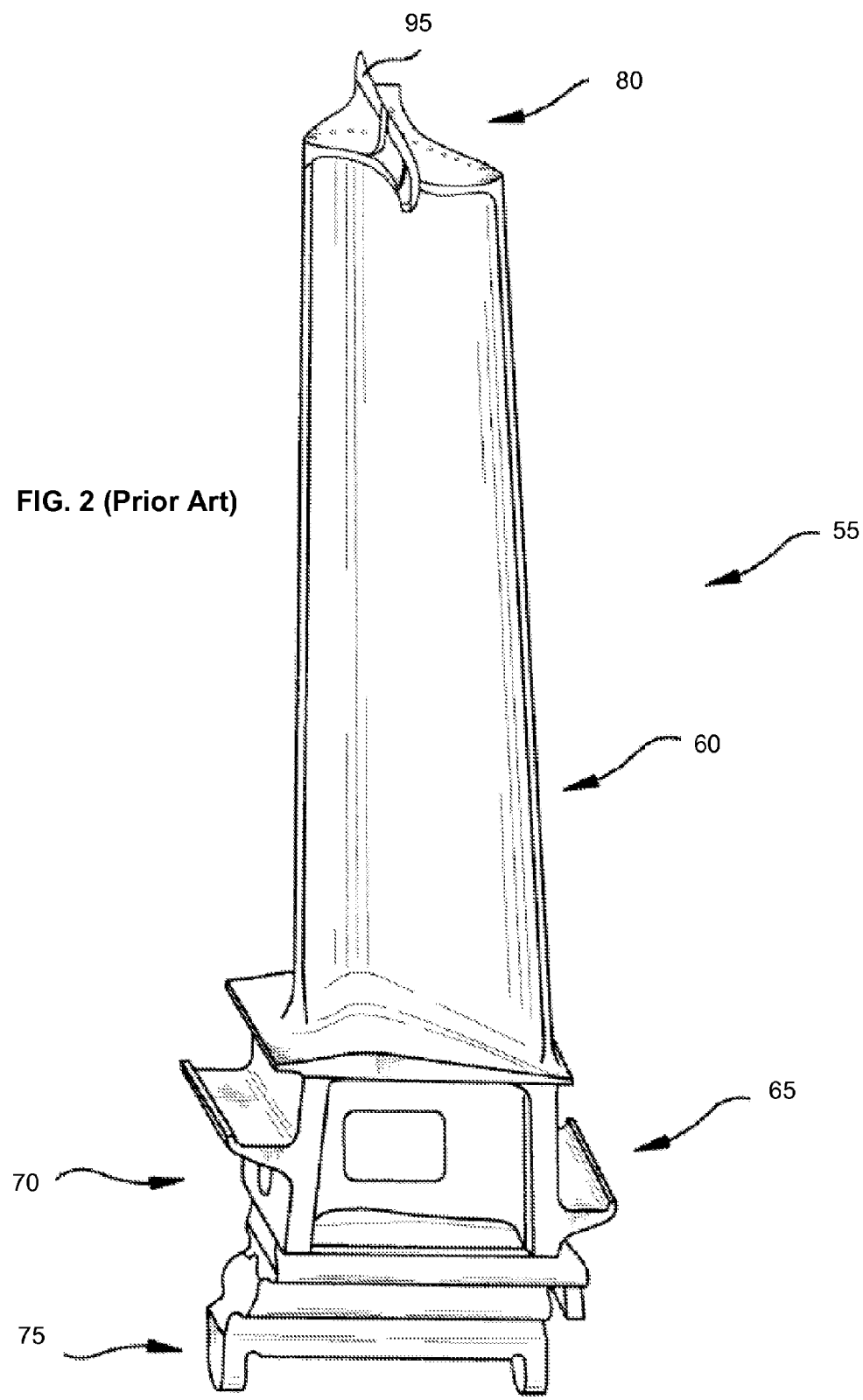
FIG. 2 is a schematic of an example turbine bucket, according to an embodiment.

FIG. 2 depicts a component of the turbine 40; specifically, a turbine bucket or blade 55. The turbine bucket 55 includes an airfoil 60 and a root 65. The airfoil 60 includes a leading edge and a trailing edge. A generally concave pressure surface and a generally convex suction surface extend between the leading and trailing edges on opposing sides of the airfoil 60. In the illustrated example, the root 65 is comprised of a shank 70 and a dovetail 75 that engages a corresponding dovetail groove on a rotor to secure the turbine bucket 55 to the rotor.

Figure 3:
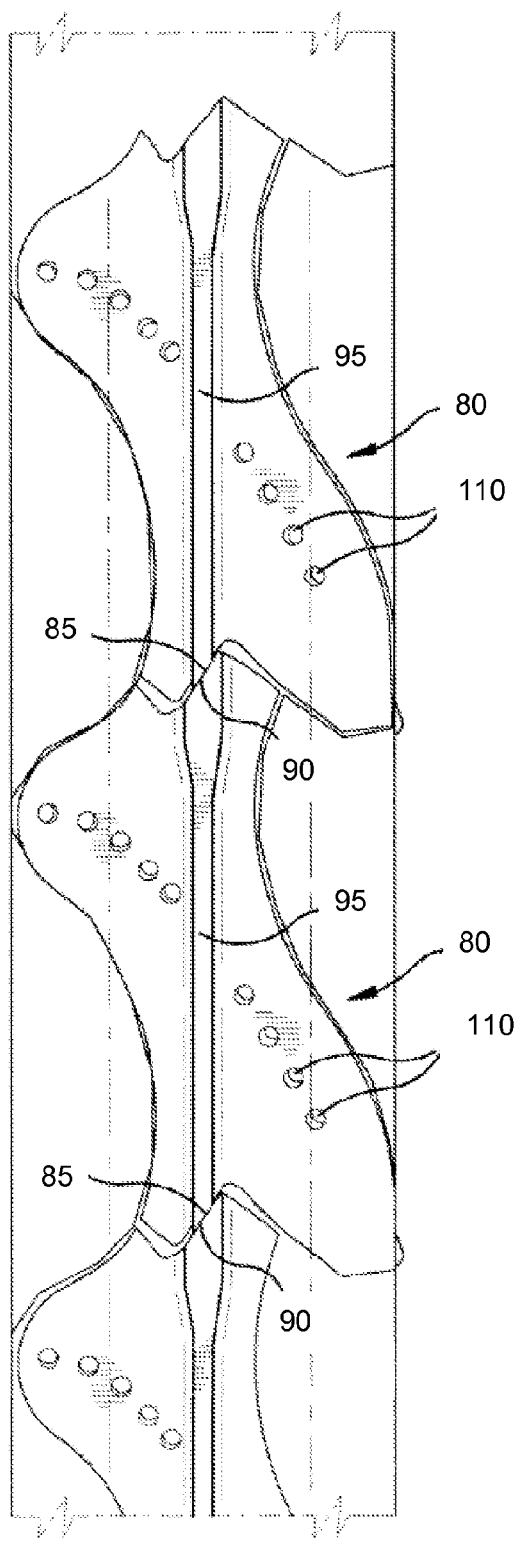
FIG. 3 is a schematic of an example shrouded turbine bucket, according to an embodiment.

As collectively depicted in FIGS. 2 and 3, a tip shroud 80 is formed at the tip of the airfoil 60 and extends perpendicularly outward from the surface of the airfoil 60. The tip shroud 80 includes radially inward and radially outward facing surfaces and is exposed to the hot compressed gas flowing through the turbine section. Each tip shroud 80 has bearing surfaces 85, 90 over which it contacts the tip shroud of an adjacent blade thereby restraining blade vibration. Furthermore, a seal rail 95 typically extends radially outward from the radially outward facing surface of the tip shroud 80 to prevent leakage of hot gas around the respective blade row. In some conventional turbine blade structures, a number of cooling air passages 110 extends radially outwardly through the blade into the blade tip. In other conventional turbine blade structures, coolant passages may be defined in the airfoil.

Figure 4:
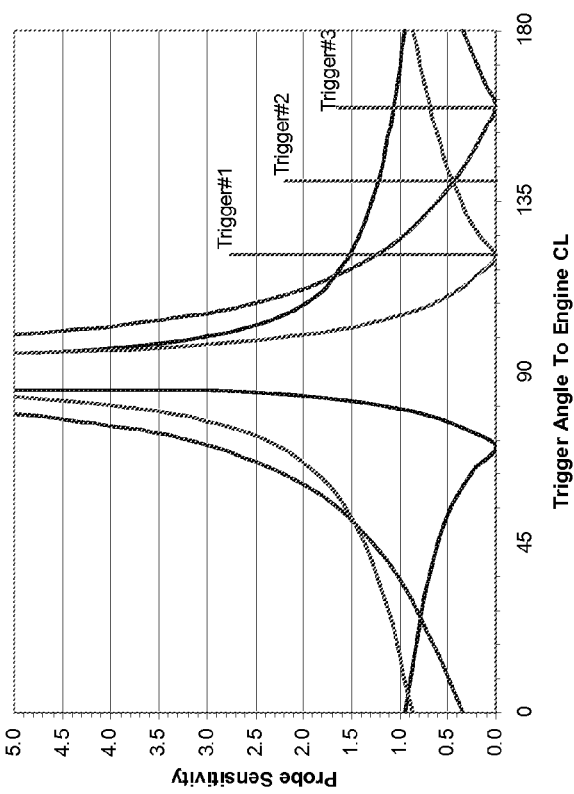
FIG. 4 is a schematic of an example shrouded turbine bucket including a number of trigger patterns, according to an embodiment.

A system for mode shape identification in turbine buckets is depicted in FIG. 4. The system includes a turbine bucket 55 having a tip shroud 80 as previously described. Moreover, the system includes trigger patterns 100 disposed on the radially outward facing surface of the tip shroud 80. A sensor 105 may be disposed adjacent to the radially outward facing surface of the tip shroud 80 for sensing the trigger patterns 100 as the trigger patterns 100 pass the sensor 105.

The trigger patterns are patterned to identify at least one mode shape of the turbine bucket. Modes are associated with structural resonances. Each mode is defined by a modal frequency, modal dampening, and a mode shape. Mode shapes define the motion of the turbine buckets.

Figure 5:
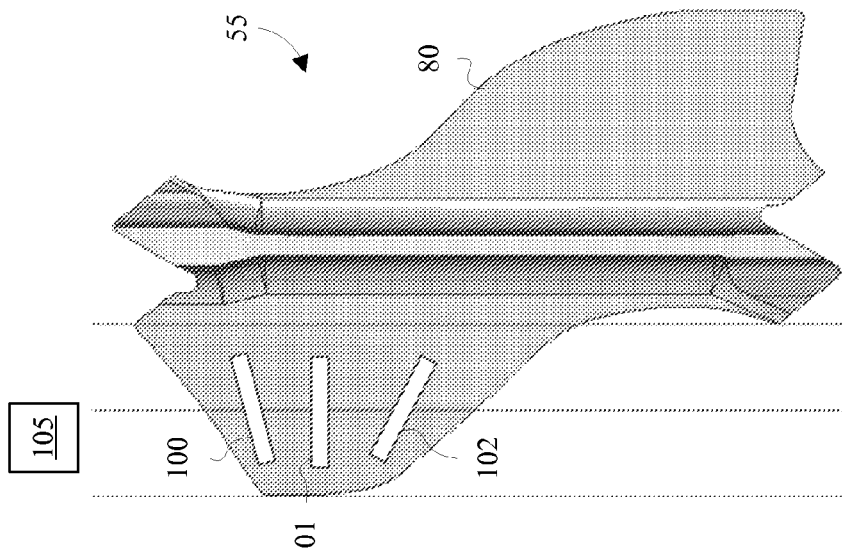
FIG. 5 is a graph illustrating probe sensitivity versus trigger angle for various mode shapes of the turbine bucket, according to an embodiment.

FIG. 5 illustrates how different trigger patterns may provide greater or lesser probe sensitivity to different turbine bucket mode shapes. For example, depending on the mode shape of the turbine bucket, various trigger angles may provide various levels of probe sensitivity. In FIGS. 4 and 5, trigger 1 corresponds to trigger 100, trigger 2 corresponds to trigger 101, and trigger 3 corresponds to trigger 102. As graphically illustrated in FIG. 5, trigger 1 and its corresponding trigger angle provides the greatest probe sensitivity to mode shape 1 and the poorest probe sensitivity to mode shape 3. Conversely, trigger 3 and its corresponding trigger angle provides the greatest probe sensitivity to mode shape 3 and the poorest probe sensitivity to mode shape 1. Accordingly, the trigger patterns may be individually and/or collectively patterned to identify various mode shape of the turbine bucket and to provide greater sensitivity to detecting various mode shapes of the turbine bucket.

In certain embodiments, the trigger patterns amplify the deflection observed by the sensor. In other embodiments, the trigger patterns are pattered to distinguish operating deflection shapes from mode shapes of the turbine bucket. Moreover, in other embodiments, the trigger patterns are pattered to determine the direction of the mode shape of the turbine bucket.

The trigger patterns may be formed by applying a pattern via coating or other means to change the reflectivity of at least a portion of the radially outward facing surface of the tip shroud. The trigger patterns may also be formed by carving, etching, or otherwise distorting at least a portion of the radially outward facing surface of the tip shroud. The trigger patterns may be any shape, size, and/or configuration necessary to identify various mode shapes of the turbine bucket and to provide greater sensitivity to detecting various mode shapes of the turbine bucket. For example, as depicted in FIG. 4, the trigger patterns include three angularly spaced rectangular strips.

The type and configuration of the sensor 105 may be similar to the sensor devices described in U.S. Pat. No. 7,861,592, which is herein incorporated by reference. For example, in certain illustrative embodiments, the sensor is a laser probe. Accordingly, the change in reflectivity facilitated by the trigger patterns alters the amount of light received from the laser probe.

The change in reflectivity of at least a portion of the radially outward facing surface of the tip shroud can be used to identify a particular features or groups of features on the turbine bucket by analyzing the time deviations for the bucket to pass the at least one sensor. Using this data, a vibratory deflection may be calculated. Moreover, applying a trigger pattern to at least a portion of the radially outward facing surface of the tip shroud can be used to discern the mode shape from other mode shapes. The trigger pattern can also be used to increase measurement capability and determine the direction of vibratory deflection.

The present systems and methods for mode shape identification have been described in relation to turbine buckets. However, other applications employing rotating elements are envisioned. Moreover, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A system for mode shape identification, comprising:
a turbine bucket;
a plurality of trigger patterns disposed at a distal end of the turbine bucket; and
at least one sensor disposed adjacent to the distal end of the turbine bucket for detecting the plurality of trigger patterns;
wherein the plurality of trigger patterns is patterned to identify at least one mode shape of the turbine bucket.

2. The system of claim 1, wherein the distal end of the turbine bucket includes a shroud.

3. The system of claim 2, wherein the plurality of trigger patterns are disposed on an outer surface of the shroud.

4. The system of claim 1, wherein the sensor is a laser probe.

5. The system of claim 1, wherein the plurality of trigger patterns amplify a deflection observed by the at least one sensor.

6. The system of claim 1, wherein the plurality of trigger patterns is patterned to distinguish operating deflection shapes from mode shapes of the turbine bucket.

7. The system of claim 1, wherein the plurality of trigger patterns is patterned to determine a direction of the mode shape of the turbine bucket.

8. A method for mode shape identification, comprising:
patterning a plurality of triggers at a distal end of a turbine bucket; and
detecting the plurality of triggers with at least one sensor disposed adjacent to the distal end of the turbine bucket, wherein the plurality of triggers is patterned to identify specific mode shapes of the turbine bucket.

9. The method of claim 8, wherein the distal end of the turbine bucket includes a shroud.

10. The method of claim 9, wherein the plurality of triggers is patterned on an outer surface of the shroud.

11. The method of claim 8, wherein the sensor is a laser probe.

12. The method of claim 8, wherein the plurality of triggers amplify a deflection observed by the at least one sensor.

13. The method of claim 8, wherein the plurality of triggers is pattered to distinguish operating deflection shapes from mode shapes of the turbine bucket.

14. The method of claim 8, wherein the plurality of triggers is patterned to determine a direction of the mode shape of the turbine bucket.

15. A system for mode shape identification, comprising:
   a rotating element;
   a plurality of trigger patterns disposed on the rotating element; and
   at least one sensor disposed adjacent to the rotating element for detecting the plurality of trigger patterns;
   wherein the plurality of trigger patterns is patterned to identify at least one mode shape of the rotating element.

16. The system of claim 15, wherein the rotating element is a turbine bucket having a shroud including the plurality of trigger patterns disposed on an outer surface of the shroud.

17. The system of claim 15, wherein the sensor is a laser probe.

18. The system of claim 15, wherein the plurality of trigger patterns amplify a deflection observed by the at least one sensor.

19. The system of claim 15, wherein the plurality of trigger patterns is patterned to distinguish operating deflection shapes from mode shapes of the rotating element.

20. The system of claim 15, wherein the plurality of trigger patterns is patterned to determine a direction of the mode shape of the rotating element.

\* \* \* \* \*